S. C. MILES.
RAKER GAGE AND JOINTER.
APPLICATION FILED OCT. 19, 1909.
962,969.
Patented June 28, 1910.
2 SHEETS—SHEET 1.
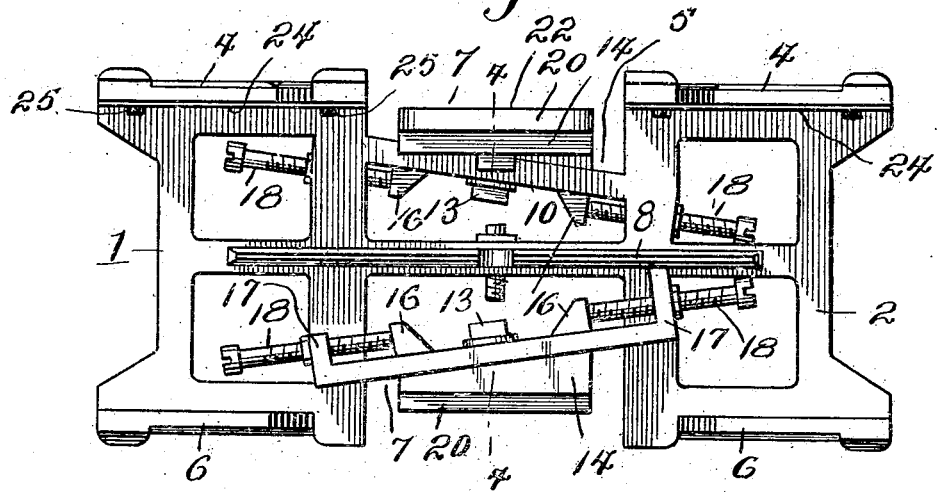
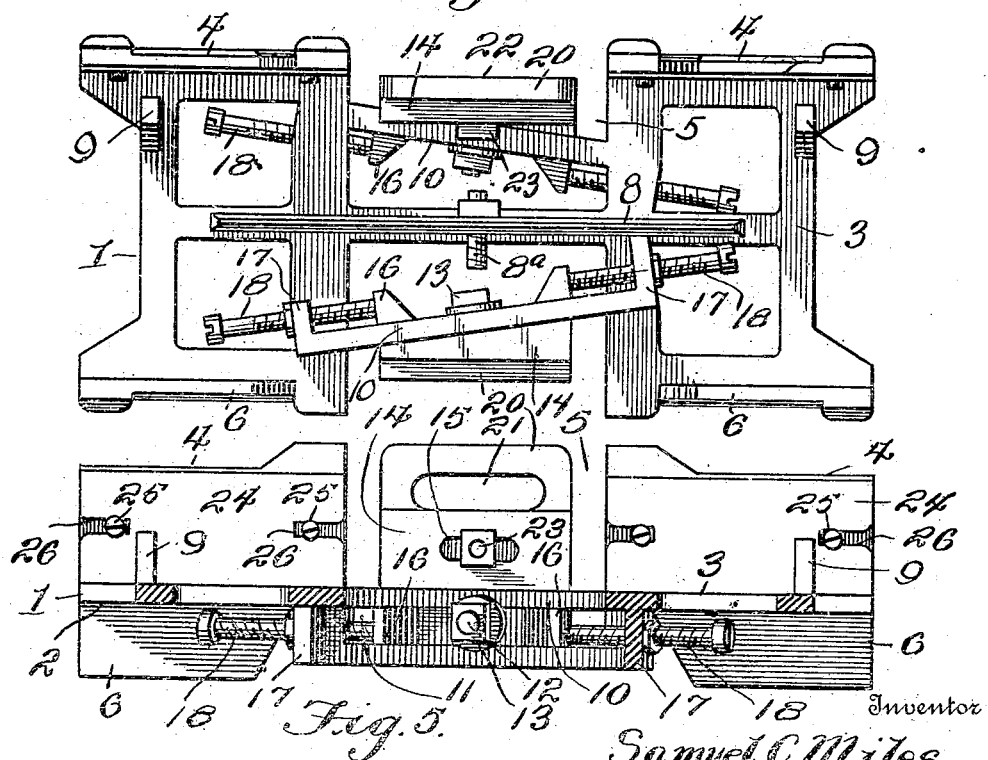
Witnesses
J. T. L. Wright
C. C. Hines
Inventor
Samuel C. Miles
By Victor J. Evans,
Attorney

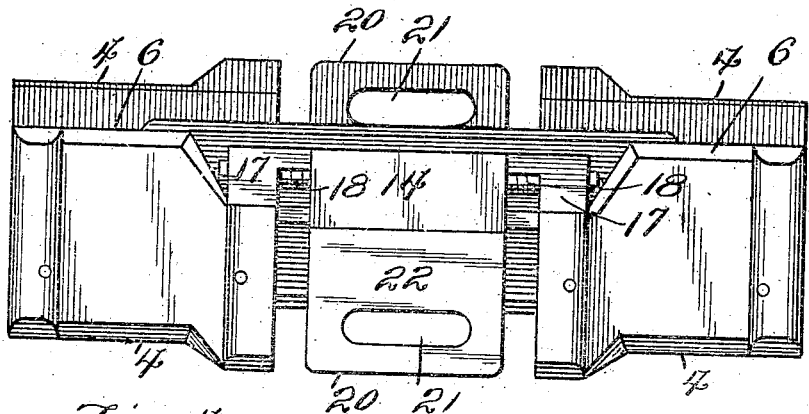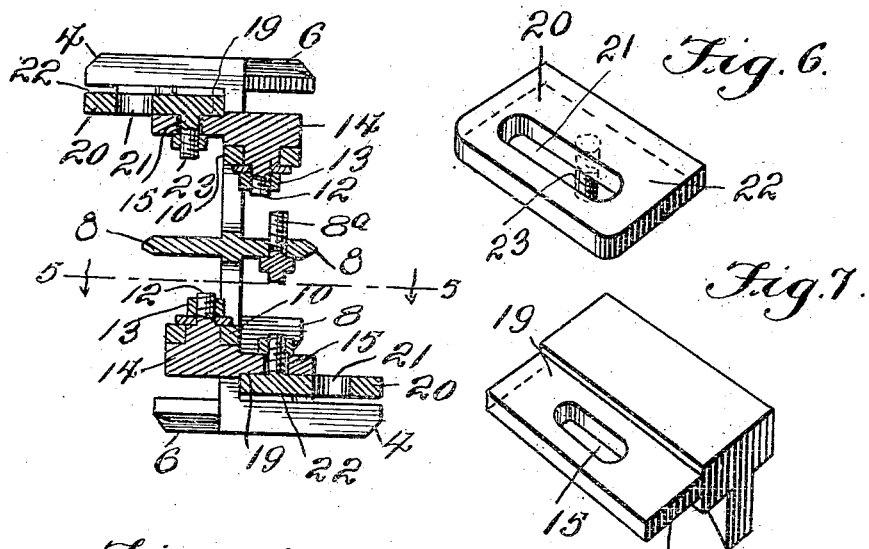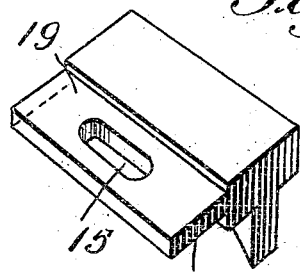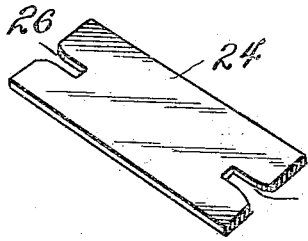

UNITED STATES PATENT OFFICE.

SAMUEL C. MILES, OF SANDY, OREGON.

RAKER GAGE AND JOINTER.

962,969. Specification of Letters Patent. Patented June 28, 1910.

Application filed October 19, 1909. Serial No. 523,377.

*To all whom it may concern:*

Be it known that I, SAMUEL C. MILES, a citizen of the United States, residing at Sandy, in the county of Clackamas and State of Oregon, have invented new and useful Improvements in Raker Gages and Jointers, of which the following is a specification.

This invention relates to a raker gage and jointer for use in jointing the raker teeth of cross-cut saws, the object of the invention being to provide a simple and effective device of this character whereby the saw may be firmly supported and the raker teeth jointed with accuracy, and also whereby the height or length of the raker teeth with relation to the cutting teeth may be regulated and said raker teeth jointed with uniformity along the entire length of the saw.

A further object of the invention is to provide a jointing tool in which the gage plates against which the cutting teeth abut are reversible to present new surfaces for use when worn, and also in which duplicate sets of gaging and jointing devices are employed which may be interchangeably used by simply reversing the position of the tool.

With these and other objects in view, the invention consists of the features of construction, combination and arrangement of parts hereinafter fully described and claimed, reference being had to the accompanying drawings, in which:—

Figure 1 is a side elevation looking toward one of the working faces of a raker and jointer embodying my invention. Fig. 2 is a reverse side elevation thereof. Fig. 3 is a top plan view. Fig. 4 is a vertical cross section on line 4—4 of Fig. 1. Fig. 5 is a longitudinal section on line 5—5 of Fig. 4. Fig. 6 is a perspective view of one of the slotted raker teeth holders. Fig. 7 is a similar view of its adjustable carrier. Fig. 8 is a view of one of the reversible gage or wear plates against which the cutting teeth abut.

The tool comprises a skeleton frame plate 1 having duplicate working faces 2 and 3, so that a description of one with certain exceptions will suffice for both. Each face is provided along one of its longitudinal side edges with spaced abutment flanges 4 providing an intervening central slot 5, and along its opposite longitudinal side edge with spaced supporting flanges 6 providing an intervening slot 7 in transverse alinement with the slot 5. The flanges 4 extend laterally beyond the outer edges of the flanges 6, which latter serve as supporting surfaces against which the body of the saw bears. A central longitudinal rib 8 projects from each working face and lugs 9 project from one of the working faces and have their outer surfaces in alinement with the edges of the flanges 6 to serve as additional bearing portions so that the device may rest firmly against the saw.

The frame is provided with portions 10 forming the inner walls of the slots 5 and 7, which walls are inclined at a suitable angle to the longitudinal plane of the flanges 4, each of said portions or walls being provided with a longitudinal slot 11 for the passage of a bolt 12 carrying a clamping nut 13. Engaging the inclined face of the wall 10 is a carrier block or plate 14 having a longitudinal slot 15, said plate being arranged inwardly of or below and parallel with the flanges 4. Said carrier block is also provided with an inner or lower inclined face to engage the beveled or inclined face of the surface 10, and is accordingly approximately wedge shaped, the construction being such that said block or plate may be adjusted longitudinally on the wall 10 toward one or the other of the flanges 4 to adjust and regulate the height or position of the carrier plate with relation to said flanges. The carrier block or plate may be secured in adjusted position by tightening the nut 13 of the bolt 12 which travels in the slot 11, through which slot also extend lugs 16 projecting from the carrier block in parallel relation to the reverse face of the plate, the wall 10 of which is provided with angularly bent end portions 17 having perforated openings for the passage of adjusting screws 18 bearing against the said lugs, by which the carrier block may be conveniently adjusted in either direction to an accurate degree and then fastened against possibility of movement by tightening the nut 13.

Each carrier plate, which may be formed of brass or other suitable material, has its inner or lower face recessed and beveled as described to engage the inclined surface of the wall 10 and its outer or upper faces recessed, as at 19, to receive a gage plate or holder 20, preferably formed of steel and suitably fastened to the carrier plate, which gage plate is arranged on a line between the flanges 4 and below the same and is provided with a transverse slot 21 for the passage of the raker teeth of the saw, the upper or outer face 22 of said plate being plane to form a guide surface for the sharpening or dressing file. A screw 23 works in a threaded opening in the gage plate and extends through the slot 15 in the carrier plate, by which the gage plate may be adjusted longitudinally on the carrier plate and fastened in adjusted position. The abutting flanges 4 are provided with wear plates 24 secured thereto by screws 25, against which plates the cutting teeth of the saw are designed to bear. These screws pass through end slots 26 in the plates, by which either plate may be turned around or reversed as to position in an obvious manner to present a new surface for wear after the surface in use has become unduly worn.

In the construction shown, the abutment flanges 4 and supporting flanges 6 projecting from each face of the body 1 are arranged in respective alinement with the supporting flanges and abutment flanges projecting from the reverse side of the body, while the respective oppositely arranged adjustable raker tooth holders 20 extend through the respective slots beyond the reverse sides of the body, so that by simply reversing the tool by turning it half way around and upside down from either position either set of the duplicate gage and jointing devices may be employed. By this construction and arrangement of the parts a tool is provided that may be employed for a long period, and its lifetime may be further prolonged by simply renewing the wear plates and raker tooth holders as occasion requires.

In the use of the device, assuming the parts upon the face 2 to be employed in use, it will be understood that the body 1 is disposed in a vertical position, so as to cause the flanges 4 to overhang the teeth of the saw, the body of which rests against the supporting surfaces 6 and 9. The device is adjusted in practice along the saw, the cutting teeth of which have been previously sharpened, until one of the raker teeth enters the slot 21 in the holder 20 and the adjacent cutting teeth at opposite sides thereof bear against the wear plates 24. The face 22 of the holder will thereupon serve as a gage through which the points of the raker teeth will project, allowing them to be jointed or dressed down into proper alinement with the points of the cutting teeth by reciprocating a file across the surface 22. If it should be desired to make the points of the raker teeth higher or lower than the points of the cutting teeth, this may be accomplished by adjusting the wedge shaped holder up or down on the inclined wall 10 through the medium of the screws 18. The adjustable connection 15 and 23 between the holder 20 and the block 14 enables the holder to be set so as to lie midway of the distance between the flanges 4 irrespective of the extent of adjustment of the carrier block.

The lugs 9 are adapted to additionally serve as abutments against which a file may be clamped by a screw $8^a$ on the adjacent rib 8, so that the device may be used for jointing the cutting teeth.

I claim:—

1. A device of the character described comprising a body having spaced abutment members, and a slotted raker tooth holder supported upon said body between said members and slidably adjustable in an inclined path with relation thereto.

2. A device of the character described comprising a body having spaced abutment members, a carrier supported upon said body between said members and slidably adjustable in an inclined plane relative thereto, and a slotted raker tooth holder adjustably connected with said carrier.

3. A device of the character described comprising a body having spaced abutment members and an inclined guiding portion between the same, a carrier adjustable on said inclined guiding portion, and a slotted raker tooth gage or holder adjustably connected with the carrier.

4. A device of the character described comprising a body having spaced abutment members and an inclined guiding portion between said members, a carrier slidably engaging the inclined guiding portion, means for adjusting said carrier, and a slotted raker tooth gage or holder adjustably connected with said carrier.

5. A device of the character described comprising a body having spaced abutment flanges, a guiding portion disposed between and inclined to the plane of said flanges, said guiding portion being provided with a slot, a carrier having an inclined face and adjustable along said slot, projections on the carrier extending through the slot, adjusting devices engaging said projections, and a slotted raker tooth holder adjustably connected with said carrier.

In testimony whereof I affix my signature in presence of two witnesses.

SAMUEL C. MILES.

Witnesses:
JOHN CONLEY,
N. S. ROBERTS.